United States Patent [19]

Möller-Bremer

[11] Patent Number: 5,618,429

[45] Date of Patent: Apr. 8, 1997

[54] METHOD FOR REDUCING SLIME AND FILM FORMATION IN PLANTS IN WHICH THE WATER OF PAPER AND PULP MACHINES IS CIRCULATED AND IN PLANTS IN WHICH COOLING WATER IS CIRCULATED

[75] Inventor: Christine Möller-Bremer, Nordholz, Germany

[73] Assignee: Lumos Trading & Investments Corporation, Tortola, Virgin Islands (Br.)

[21] Appl. No.: 408,206

[22] Filed: Mar. 22, 1995

[30] Foreign Application Priority Data

Mar. 24, 1994 [DE] Germany ............... 44 10 271.2

[51] Int. Cl.⁶ ........................................ C02F 1/50
[52] U.S. Cl. .................... 210/610; 210/764; 162/161
[58] Field of Search ........................... 210/610, 611, 210/764; 162/161

[56] References Cited

U.S. PATENT DOCUMENTS

| | | | |
|---|---|---|---|
| 4,936,994 | 6/1990 | Wiatr | 210/764 |
| 5,242,593 | 9/1993 | Oberkkofler et al. | 210/764 |
| 5,411,666 | 5/1995 | Hollis et al. | 210/764 |
| 5,462,644 | 10/1995 | Woodson | 210/764 |

FOREIGN PATENT DOCUMENTS

| | | |
|---|---|---|
| 236989 | 9/1987 | European Pat. Off. . |
| 558360 | 9/1993 | European Pat. Off. . |
| 590746 | 4/1994 | European Pat. Off. . |
| 3447686.5-45 | 10/1986 | Germany . |
| 3841596.8 | 6/1990 | Germany . |
| PCT/GB91/01271 | 2/1992 | WIPO . |

OTHER PUBLICATIONS

"Biofilme und Wassertechnologie—Teil I: Entstehung, Aufbau, Zusammensetzung und Eigenschaften von Biofilmen"; Wasser•Abwasser; Hans–Curt Flemming; 132 Nr. 4; pp. 197–310 (©1991).

*Primary Examiner*—Thomas G. Wyse
*Attorney, Agent, or Firm*—Fay, Sharpe, Beall, Fagan, Minnich & McKee

[57] ABSTRACT

The invention relates to a method for reducing slime and film formation in plants in which the water of paper and pulp machines is circulated and in plants in which cooling water is circulated. By adding specific nutrients one influences the growth of the mixed microorganism population present in the circulating water, i.e. shifts it in favor of the microorganisms which do not form slime and film.

17 Claims, No Drawings

METHOD FOR REDUCING SLIME AND FILM FORMATION IN PLANTS IN WHICH THE WATER OF PAPER AND PULP MACHINES IS CIRCULATED AND IN PLANTS IN WHICH COOLING WATER IS CIRCULATED

The present invention relates to a method for reducing slime and film formation in plants in which the water of paper and pulp machines is circulated and in plants in which cooling water is circulated.

With water circuits, in particular with the increasingly practiced closed circulation of white water in paper machines and with cooling water circuits, slime and/or film formation occurs again and again on solid surfaces and in the liquid phase. In the closed circulation of white water practiced in paper machines microorganisms find very good growth conditions due to the high organic and inorganic nutrient supply present in the white water, and the favorable surrounding milieu such as increased temperature, pH value near the neutral point, and oxygen load. Functionally one can distinguish two classes of microorganisms: those which occur freely in the circulating water as single cells, and those which are attached singly or in colonies to fibrous substances, fillers and accepted stock and to the surfaces of machine parts, such as pipes, pumps and vessels. The nonsessile microorganisms of the first group cause no production problems since their particle sizes are under 10 microns. Nonsessile microorganisms are ones which have no or little tendency to attach to surfaces. The sessile microorganisms of the second group, however, lead to problems in the form of undesirable slime and film formation. When the slime or film comes off the surfaces this results in the formation of knots and thus possibly holes in the paper web. This weakens the paper web, i.e. the latter can tear and cause machine downtimes. To prevent this slime and film formation it is known to add biocides, lignin sulfonates, selected microorganisms or enzymes to the white water.

The use of biocides suppresses the growth of the microogranisms and partly damages the microorganisms. However the use of biocides meets with increasing criticism. The greater the amount of biocide is, the more the white water harms the environment when released upon emptying of the circuit. Since microorganisms tend to become resistant to biocides it is also necessary to keep changing the biocidal agents and/or increasing the amount. This means a considerable environmental load, or considerable costs for example for a subsequent, adapted clarification plant or an outfall ditch.

Lignin sulfonates are used as so-called complexing agents that prevent ingestion of the microorganisms under certain conditions. Sometimes a biocide must also be used with lignin sulfonate, albeit to a considerably lesser extent than when biocides are used alone (cf. DE-C 34 47 686). However the problems of biocides still remain in a mitigated form.

Enzymes are added to the white water circuit to convert the high-molecular polymers which promote slime and film formation into low-molecular forms uncritical for slime and film formation. Although this method is ecologically acceptable it has hitherto not proven useful in large-scale application, presumably because it only obtains a brief reduction in viscosity since the hydrolysis or other low-molecular products formed by the enzymes can even constitute preferred nutrients for slime-forming microorganisms.

A new method is to add selected single microorganisms that lead to a high intake of nutrients present in the white water due to their great total surface. This leads to a competition for the nutrients present in the circulating water which is settled, thanks to their high nutrient uptake, in favor of the added nonsessile microorganisms, i.e. to the disadvantage of slime- and film-forming microorganisms (cf. DE-C 38 41 596). However the use of microorganisms is not suitable for all plants.

The problem of the present invention is to find an improved, ecologically acceptable method for reducing slime and film formation in the water circuit, and thus reducing downtimes, in plants in which the water of paper and pulp machines is circulated and plants with a cooling water circuit.

This problem is solved according to the invention by adding nutrients to the circulating water which favor the growth of nonsessile microorganisms.

One preferably adjusts in the circulating water a nutrient supply that favors the growth of nonsessile microorganisms over the growth of sessile microorganisms. This is obtained by adding specific nutrients that change the total nutrient supply so as to have a positive influence on the composition of the species of microorganisms occurring naturally in the circuit or else artificially added, thereby promoting the growth of nonsessile microorganisms and thus preventing the growth of sessile, slime- and film-forming microorganisms.

In a preferred embodiment of the inventive method macro- and/or micronutrients are added to the circulating water. As macronutrients one preferably selects carbon, nitrogen, phosphorus, sulfur, sodium, potassium, calcium, magnesium and/or chlorine compounds which are soluble in water.

Preferred micronutrients are the trace elements iron, copper, manganese, zinc, bromine, molybdenum, vanadium, cobalt, iodine and/or selenium and the vitamins biotin, nicotinic acid, thiamin, 4-aminobenzoate, pantothenate, pyridoxamine and/or cyanocobalamin.

These nutrients are selected in accordance with the particular organic freight or the mixed microorganism population. They can be used singly or in combination.

The nutrients are preferably introduced directly into the primary circuit of the particular circulating water. However they can also be introduced in a particularly suitable way into secondary circuits associated with the primary circuit. To increase the time of contact of microorganisms with nutrients, as might be necessary in plants with high flow rates, it is advantageous to remove an amount of circulating water into a secondary circuit and add the nutrients there.

The nutrients can be added in time-proportional or quantity-proportional fashion depending on the particular requirements.

The idea underlying the invention is the fact that water circuits of paper and pulp machines and cooling water circuits generally contain mixed populations of microorganisms that are adapted optimally to the particular environmental conditions. Such a mixed population comprises many individual species each of which has its own growth parameters. To characterize cell growth one uses the specific growth rate $\mu_{max}$ and the substrate concentration or nutrient concentration $K_s$ at which the growth rate of a culture reaches the half-maximum value. Thus each species has certain $\mu_{max}$ and $K_s$ values in relation to a certain substrate ("Allgemeine Mikrobiologie", H. G. Schlegel, Thieme Verlag, Stuttgart, 1985).

Comparing the growth curves of two microorganisms with different $\mu_{max}$ and $K_s$ values one sees that the strain with low $\mu_{max\ and\ Ks}$ values has a growth advantage at low substrate concentrations, while the strain with high $\mu_{max}$ and $K_s$ values does at higher ones. Depending on the substrate concentration one of the two strains is thus at an advantage ("control of activated-sludge filamentous building", J. chudoba, P. Grau und V. Ottova, Water Research 7, p. 1389–1406, 1973).

Examining the growth kinetics of the individual groups of microorganisms in water circuits, one can distinguish roughly two groups:

1. Fast-growing nonsessile single cells with high $K_s$ values, and
2. Slow-growing filamentous sessile microorganisms with low $K_s$ values.

This means low substrate concentrations promote the growth of filamentous and thus problematic microorganisms. At higher substrate concentrations, however, conditions prevail that favor the growth of single cells. These single cells cause no production problems since they generally form no solid, skinlike films.

Group 1, fast-growing nonsessile microorganisms living mainly as single cells, includes the following species: Pseudomonas, Arthrobacter, Acromonas, Vibrio, Acinetobacter, Bacillus, Alcaligen, Enterobacteriaceae, Lactobacillus, Micrococcus, Staphylococcus and Streptococcus.

Group 2, filamentous sessile microorganisms and slime producers, includes sphaerotilus, Beggiatoa, Flexibacter, Haliscomenobacter, Nocardia, Thiothrix, Microthrix, various other bacteria not yet exactly defined and bearing only type designations ("Handbuch für die mikroskopische Schlammuntersuchung", Eikelboom und v. Buijse, Hirthammer Verlag, München, 1983), and the large group of hypha-forming fungi.

The inventive method is based on the addition of those factors or nutrients which remove the limitation of single cells in the system, i.e. promote their growth. Analyzing the chemical composition of the mixtures in water circuits one finds that nitrogen N and phosphorus P, for example, are present only in small amounts. These conditions favor filamentous microorganisms, and one must tilt this balance by suitably adding nutrients.

The most important macro- and micronutrients whose concentration is crucial for the biological balance and thus the reduction of slime and film formation include, as macronutrients, carbon C, nitrogen N, phosphorus P, sulfur S, sodium Na, potassium K, calcium Ca, magnesium Mg, chlorine cl, and, as micronutrients, the trace elements iron Fe, copper Cu, manganese Mn, zinc Zn, bromine Br, molybdenum Mo, vanadium V, cobalt Co, iodine I and selenium Be, as well as the vitamins biotin, nicotinic acid, thiamin, 4-aminobenzoate, pantothenate, pyridoxamine and cyanocobalamin.

As sources for the abovementioned macro- and micronutrients one can use for example glucose, saccharose, starch, ammonia, sodium nitrate, urea, orthophosphoric acid, polyphosphates, ferric sulfate, potassium dihydrogenphosphate, magnesium sulfate, calcium carbonate, sodium chloride, water glass and the like.

It is unnecessary within the framework of the invention to state a precise range for the amounts of nutrients to be added. The amount will instead be determined depending on the deficit of nutrients necessary for growth of the nonsessile bacteria.

The biomass in water circuits is generally composed as follows (in % of dry substance TS):

| C: 46.9 | K: 2.2 |
|---|---|
| H: 6.4 | Mg: 0.3 |
| O: 32.9 | Ca: 0.1 |
| N: 8.4 | Na: 0.05 |
| P: 1.2 | Si: 0.05 |
| S: 0.6 | Fe: 0.005 |

In the following the inventive method will be described more precisely with reference to examples.

EXAMPLE 1

In this example the amounts to be added are determined and listed for two typical elements. For this purpose the following assumptions are made.

1. Composition of the biomass (as above);
2. The mass of a bacterium with a diameter of 1 micron, density of 1.1 g/cm³ and spherical form is $5.72 \times 10^{-13}$ g.
3. Concentration of the most important ions in the white water of a paper machine ("Untersuchung yon Störsubstanzen in geschlossenen Kreislaufsystemen", W. Auhorn und J. Melzer, Wochenblatt für Papierfabrikation 107, p. 493–502, 1979).

This results in the following concentrations required for maintaining the cell mass for the two elements N and P in accordance with fresh water consumption. The data relate to mg/kg paper.

| Fresh water consumption | $10^7$ germs/ml | | $10^8$ germs/ml | |
|---|---|---|---|---|
| | N | P | N | P |
| 10 l/kg | 4.8 | 0.68 | 48 | 6.8 |
| 30 l/kg | 14.4 | 2.04 | 144 | 20.4 |

In the white water of a paper mill one typically finds the following N and P values (in mg/kg paper)

| Fresh water consumption | N | P |
|---|---|---|
| 10 l/kg | 53.7 | 3 |
| 30 l/kg | 24.6 | 9 |

By subtracting the actual from the ideal concentrations one obtain the following table (values in mg/kg paper)

| Fresh water consumption | $10^7$ germs/ml | | $10^8$ germs/ml | |
|---|---|---|---|---|
| | N | P | N | P |
| 10 l/kg | — | — | — | 3.8 |
| 30 l/kg | — | — | 119.4 | 11.4 |

This example shows that nitrogen N and phosphorus P are present in too low a concentration at a bacterial load of $10^8$ germs/ml, as is quite customary in closed paper machine circuits ("Mikrobiologie des Fabrikationswassers", A. Geller, Wochenblatt für Papierfabrikation 7, p. 219–221, 1981). They are added in the corresponding differential concentrations to increase the growth of nonsessile microorganisms.

EXAMPLE 2

In this example experiments lasting several days were performed in two laboratory test plants, one being operated without the addition of nutrients as a control.

10 l white water I from a paper machine in which writing paper with a high waste-paper content is produced was circulated at 35° C. simultaneously in each of two experimental plants in the laboratory. 2 l a day were replaced by fresh white water I.

The two identically constructed experimental plants comprised a store tank (6 l) and a basin (4 l) in which metal strips were suspended for measuring fouling. The white water was circulated with a pump to ensure the same nutrient concentration, temperature and oxygen supply throughout the experimental plant.

The bacterial load in this circulating water was $5 \times 10^8$ germs/ml (48 h incubation on standard plate count agar at 30° C.).

The two experimental plants were operated for one week, one plant being used as a control without the addition of nutrients, and 50 ml nutrient solution being added to the other per day.

Nutrient solution:
20 g/l $NH_4Cl$
10 g/l $K_2HPO_4$
5 g/l $FeSO_4.7H_2O$
5 g/l $MgSO_4$ In the plant without added nutrients there was already clear slime and film formation on the metal coupons suspended for measuring fouling after 2 days, while only very thin films were detectable in the reference plant with added nutrients.

After 7 days the difference was even clearer. In the control plant without added nutrients thick, viscous deposits had formed. In the parallel reference plant, however, there were only thin, readily detachable films which were furthermore very readily dispersible.

If a circulation system requires high fresh water consumption, as in a paper machine for example, high flow rates result. This can lead to premature washing out of the added nutrients and thus to an insufficient time of contact with the microorganisms which are to take up the nutrients. According to the inventive method this potential problem is solved in a preferred embodiment by a secondary circuit. Part of the circulating water is removed and bypassed via a buffer vessel for treatment with added nutrients. After a sufficient time of contact to ensure that the microorganisms can actually take up and store the added nutrients the tank contents are returned to the primary circuit. There the thus treated nonsessile microorganisms have a growth advantage over the sessile slime- and film-forming microorganisms that remained in that circuit. There is a reduction in slime and film formation in the production circuit.

The addition of nutrients both to the primary circuit and to any secondary circuits can take place in time-proportional fashion, which means that a certain amount is charged preferably continuously for a certain time period. Addition can also be quantity-proportional, which means that the concentration of certain nutrients in the primary circuit is determined automatically and the addition of these nutrients controlled in accordance with the concentration.

The addition of nutrients is determined in type and composition according to the nutrient supply present in the circulating water and the microorganism population present. One should always select nutrients that suppress the growth of sessile, filamentous microorganisms.

Obviously, further additives can also be used in the circulating water within the framework of the invention. These are in particular surface-active agents which reduce the sessility of the mixed microorganism population as a whole, lignin sulfonate according to the method of DE-C 34 47 686, enzymes for catalytically decomposing the organic substances contained in the circulating water. One can also enrich the circulating water with oxygen by gassing it with air or oxygen or adding oxygen-releasing substances such as $H_2O_2$. Oxygen accelerates the decomposition of organic substances in the circulating water. The additional measures to be specifically taken depend largely on the type of plant.

I claim:

1. A method for reducing slime and film formation in a plant which circulates water from paper and pulp machines or a plant which circulates cooling water, said method comprising the steps of: (a) adding nutrients which favor the growth of non-sessile microorganisms to the circulating water; and (b) adjusting the addition of the nutrients to favor the growth of non-sessile microorganisms over the growth of sessile microorganisms.

2. The method of claim 1, wherein the nutrients added are macronutrients, micronutrients or a mixture thereof.

3. The method of claim 2, wherein the macronutrients are selected from the group consisting of carbon, nitrogen, phosphorus, sulfur, sodium, potassium, calcium, magnesium and chlorine or a mixture thereof.

4. The method of claim 2 wherein the micronutrients are selected from the group consisting of trace elements of cobalt, iodine and selenium or a mixture thereof.

5. The method of claim 2, wherein the micronutrients are selected from the group of vitamins consisting of biotin, nicotinic acid, thiamin, 4-aminobenzoate, pantothenate, pyridoxamine and cyanocobalamin or a mixture thereof.

6. The method of claim 1, wherein the nutrients are added directly into a primary circuit of the circulating water.

7. The method of claim 1 wherein the nutrients are added to secondary circuits associated with the primary circuit.

8. The method of claim 7, wherein a part of the water from the primary circuit is added to the secondary circuits to increase the time of contact with the microorganisms.

9. The method of claim 7, wherein the nutrients are added in time-proportional fashion.

10. The method of claim 7, wherein the nutrients are added in quantity-proportional fashion.

11. The method of claim 4, wherein the macronutrients are selected from the group consisting of carbon, nitrogen, phosphorus, sulfur, sodium, potassium, calcium, magnesium and chlorine or a mixture thereof.

12. The method of claim 5, wherein the macronutrients are selected from the group consisting of carbon, nitrogen, phosphorus, sulfur, sodium, potassium, calcium, magnesium and chlorine or a mixture thereof.

13. The method of claim 3, wherein the micronutrients are selected from the group consisting of trace elements of iron, copper, manganese, zinc, bromine, molybdenum, vanadium, cobalt, iodine and selenium or a mixture thereof.

14. The method of claim 5, wherein the micronutrients are selected from the group consisting of trace elements iron, copper, manganese, zinc, bromine, molybdenum, vanadium, cobalt, iodine and selenium or a mixture thereof.

15. The method of claim 3, wherein the micronutrients are selected from the group of vitamins consisting of biotin, nicotinic acid, thiamin, 4-aminobenzoate, pantothenate, pyridoxamine and cyanocobalamin or a mixture thereof.

16. The method of claim 4 wherein the micronutrients are selected from the group of vitamins consisting of biotin, nicotinic acid, thiamin, 4-aminobenzoate, pantothenate, pyridoxamine and cyanocobalamin or a mixture thereof.

17. The method of claim 1 wherein the step of adjusting the addition of the nutrients comprises determining an actual concentration and a target concentration for the nutrients in the circulating water; comparing the actual concentration and the target concentration to determine a deficit between the actual concentration and target concentration; and adding nutrients to the circulating water to remove the deficit.

* * * * *